(12) United States Patent
Liu

(10) Patent No.: US 10,028,547 B2
(45) Date of Patent: Jul. 24, 2018

(54) METHOD FOR PRODUCING FLIP-FLOP SHOE

(71) Applicant: Chang-Cheng Liu, Taoyuan (TW)

(72) Inventor: Chang-Cheng Liu, Taoyuan (TW)

( * ) Notice: Subject to any disclaimer, the term of this patent is extended or adjusted under 35 U.S.C. 154(b) by 57 days.

(21) Appl. No.: 15/013,059

(22) Filed: Feb. 2, 2016

(65) Prior Publication Data

US 2016/0331062 A1 Nov. 17, 2016

(30) Foreign Application Priority Data

May 15, 2015 (TW) .............................. 104115473 A

(51) Int. Cl.
*A43B 3/12* (2006.01)
*B29D 35/02* (2010.01)

(52) U.S. Cl.
CPC ................ *A43B 3/12* (2013.01); *B29D 35/02* (2013.01)

(58) Field of Classification Search
CPC ........ B29D 35/0009; B29D 35/02; A43B 3/12
See application file for complete search history.

(56) References Cited

U.S. PATENT DOCUMENTS

| 1,881,248 A | * | 10/1932 | Steppe | B29D 35/02 |
| | | | | 249/160 |
| D665,981 S | * | 8/2012 | Hill | D2/917 |
| 2004/0231191 A1 | * | 11/2004 | Seamans | A43B 1/0081 |
| | | | | 36/11.5 |

* cited by examiner

*Primary Examiner* — Galen H Hauth
(74) *Attorney, Agent, or Firm* — Alan D. Kamrath; Kamrath IP Lawfirm, P.A.

(57) ABSTRACT

A method is provided for integrally forming a flip-flop shoe including a sole, a vamp having a toe slot, and a rib interconnected between the sole and the vamp. A sole cavity is defined between middle and lower molds. A vamp cavity is defined between upper and middle molds. An insertion block on the upper mold is received in a slot of the middle mold and corresponds to the toe slot. A rib cavity is defined between an end of the slot and the insertion block and intercommunicates with the sole cavity and the vamp cavity. Molten plastic material is filled into the sole cavity, the vamp cavity, and the rib cavity to form an integral flip-flop shoe including the sole, the vamp, the rib, and the toe slot. The upper and lower molds are then opened, and the integral flip-flop shoe is removed from the middle mold.

5 Claims, 11 Drawing Sheets

METHOD FOR PRODUCING FLIP-FLOP SHOE

BACKGROUND OF THE INVENTION

The present invention relates to the field of footwear production and, more particularly, to a flip-flop shoe and a method for producing the flip-flop shoe.

A sandal generally includes a vamp connected to a front section of a sole. An opening extends between the vamp and the sole and extends from the front end through the rear end of the sandal, permitting easy wearing and taking off of the sandal. However, the sandal is apt to loosen or fall from the foot, adversely affecting the use safety.

A flip-flop shoe currently available in the market generally includes a Y-shaped strap that passes between the first and second toes and around both sides of the foot of a wearer. The sole of the flip-flop shoe includes an insertion hole. An end of the Y-shaped strap extends through and engages with the insertion hole.

However, the flip-flop shoe cannot protect the instep and the toes of the foot of the wearer. Furthermore, when walking into shallow water, the stepping pressure on the sole of the flip-flop shoe squeezes the water upwards through the insertion hole of the sole to the top face of the sole, leading to a dirty foot and seriously affecting hygiene.

Thus, a need exists for a novel flip-flop shoe that mitigates and/or obviates the above disadvantages.

BRIEF SUMMARY OF THE INVENTION

An objective of the present invention is to provide a flip-flop shoe capable of protecting the instep and the toes of the foot of the wearer, providing wearing comfort, hygiene and safety.

Another objective of the present invention is to provide a method for producing a flip-flop shoe to achieve automatic mass production of integrally formed flip-flop shoes by using an upper mold, a middle mold, and a lower mold, greatly saving manpower and working hours.

In a first aspect, a method is provided for integrally forming a flip-flop shoe including a sole, a vamp integrally connected to an edge of the sole, and a rib interconnected between the sole and the vamp. The sole, the vamp, and the rib are integrally formed of the same material as an inseparable member. The vamp is adapted to extend around an instep and toes of a foot of a wearer. The rib is adapted to extend between two of the toes of the foot of the wearer. The vamp includes upper and lower sides and a toe slot extending from the upper side through the lower side of the vamp and aligned with the rib. The toe slot extends forward to a location adjacent to a front edge of the vamp. The method includes:

(A) preparing a mold device including an upper mold, a middle mold, and a lower mold corresponding to a shape of the flip-flop shoe, with the middle mold including a slot extending forwards and corresponding to the rib and the toe slot, and with the upper mold including an insertion block extending downwards and corresponding to the toe slot;

(B) actuating the mold device to close the upper and lower molds, with the middle mold located between the upper and lower molds, with a sole cavity for forming the sole defined between the middle mold and the lower mold, with a vamp cavity for forming the vamp defined between the upper mold and the middle mold, with the insertion block of the upper mold received in the slot of the middle mold, with a rib cavity for forming the rib defined between an end of the slot of the middle mold and the insertion block, and with the rib cavity having two ends intercommunicated with the sole cavity and the vamp cavity, respectively;

(C) filling molten plastic material into the sole cavity, the vamp cavity, and the rib cavity of the mold device to form an integral flip-flop shoe including the sole, the vamp, the rib, and the toe slot; and (D) actuating the mold device to open the upper and lower molds, and removing the integral flip-flop shoe from the middle mold.

Each of the upper mold and the middle mold can include a plurality of protrusions in the vamp cavity. The plurality of protrusions of the upper mold abuts the plurality of protrusions of the middle mold, forming a plurality of through-holes in the vamp of the flip-flop shoe.

The insertion block of the upper mold can extend forwards to a location adjacent to a front edge of the vamp cavity.

The sole cavity, the vamp cavity, and the rib cavity of the mold device can have shapes smaller than shapes of the sole, the vamp, and the rib of the flip-flop shoe. Step (C) can include filling molten plastic foam material into the mold device to form a foaming flip-flop shoe, and step (D) can include removing the flip-flop shoe in a foaming, expanding state from the middle mold.

The method can further include a step (E) of placing the flip-flop shoe in the foaming, expanding state on a shoe last and proceeding with cooling and shaping, and then removing an integrally foamed flip-flop shoe from the shoe last.

In a second aspect, a flip-flop shoe includes a sole, a vamp integrally connected to an edge of the sole, and a rib interconnected between the sole and the vamp. The sole, the vamp, and the rib are integrally formed of the same material as an inseparable member. The vamp is adapted to extend around an instep and toes of a foot of a wearer. The rib is adapted to extend between two of the toes of the foot of the wearer. The vamp includes upper and lower sides and a toe slot extending from the upper side through the lower side of the vamp and aligned with the rib. The toe slot extends forward to a location adjacent to a front edge of the vamp.

The present invention will become clearer in light of the following detailed description of illustrative embodiments of this invention described in connection with the drawings.

DETAILED DESCRIPTION OF THE INVENTION

Figure 1:
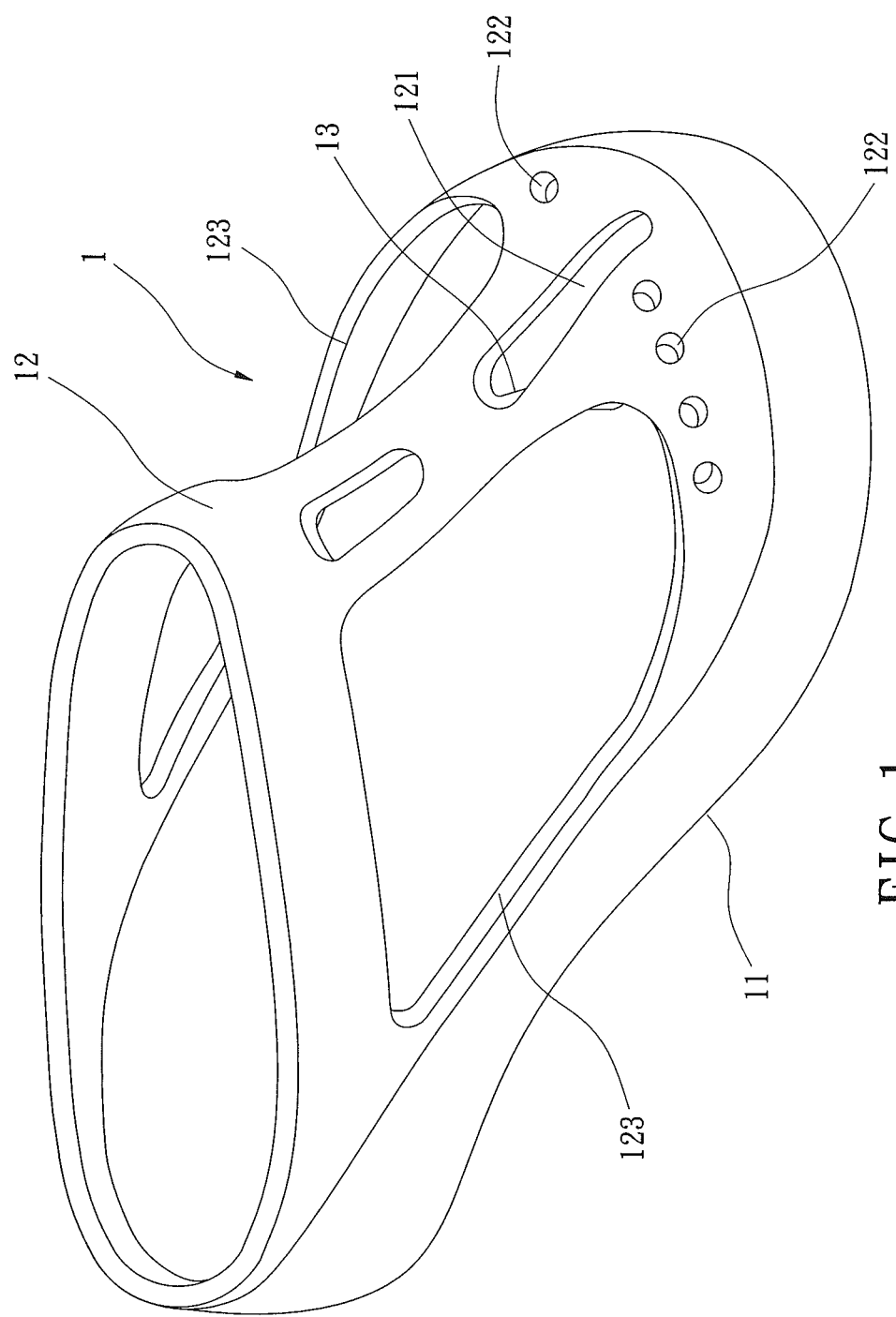
FIG. 1 is a perspective view of a flip-flop shoe according to the present invention.
Figure 2:
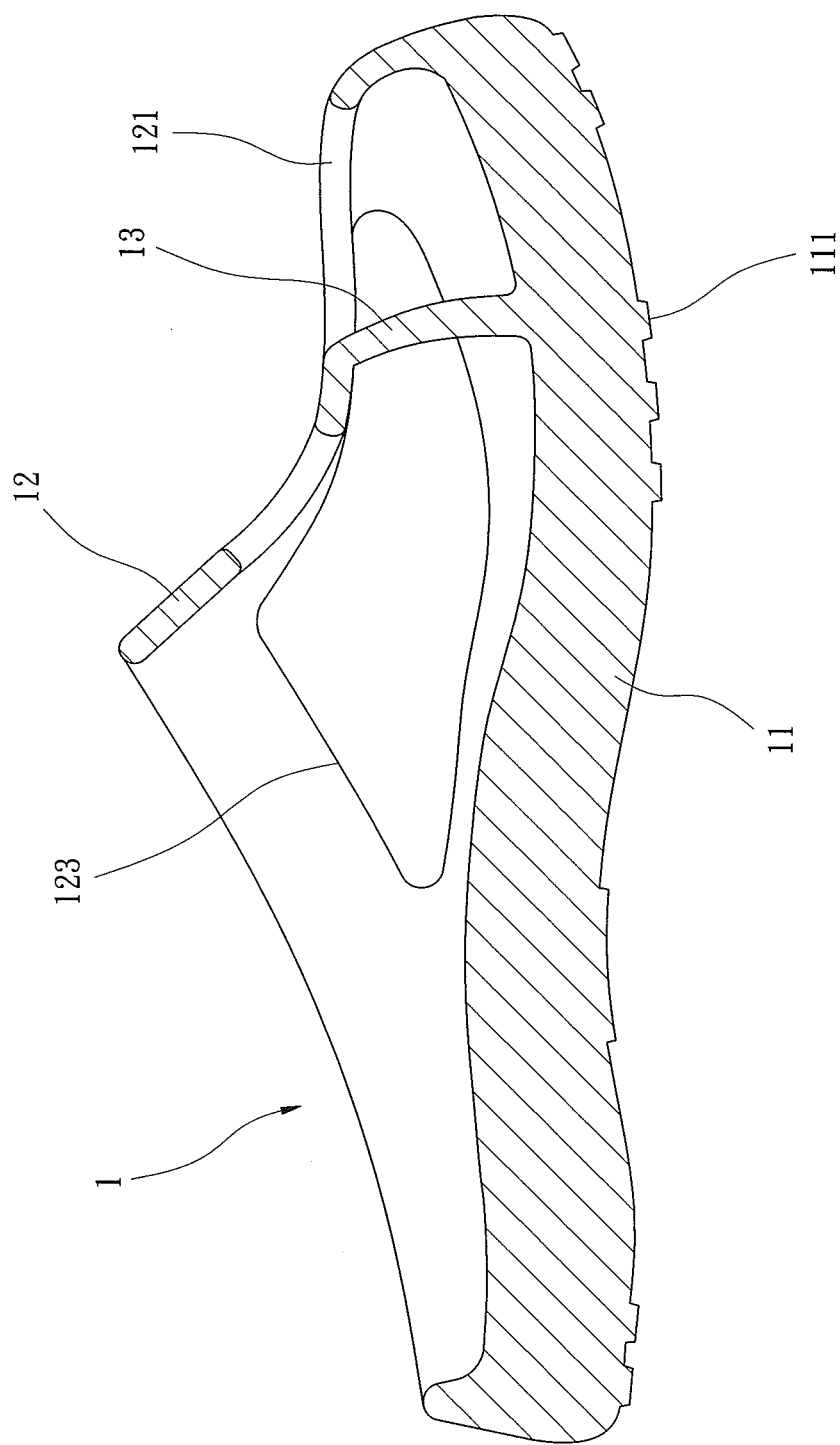
FIG. 2 is a cross sectional view of the flip-flop shoe of FIG. 1.
Figure 3:
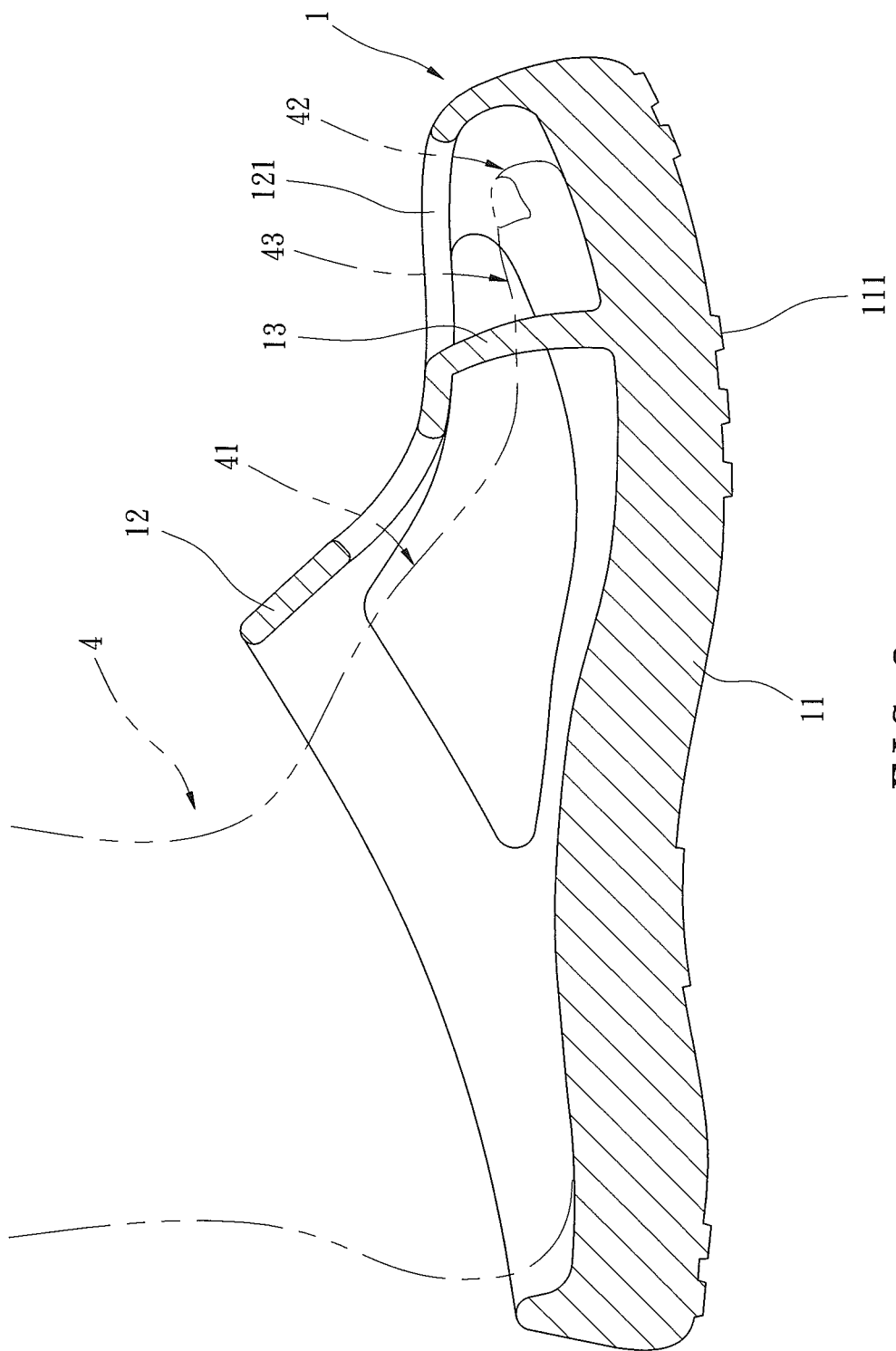
FIG. 3 is a view similar to FIG. 2, illustrating use of the flip-flop shoe.

With reference to. FIGS. 1-3, a flip-flop shoe 1 according to the present invention includes a sole 11, a vamp 12 integrally connected to an edge of the sole 11, and a rib 13 interconnected between the sole 11 and the vamp 12. The sole 11, the vamp 12, and the rib 13 are integrally formed of the same material as an inseparable member. The vamp 12 is adapted to extend around an instep 41 and toes 42 of a foot 4 of a wearer. The rib 13 is adapted to extend between two toes (generally the first and second toes) of the foot 4 of the wearer. The vamp 12 includes upper and lower sides and a toe slot 121 extending from the upper side through the lower side of the vamp 12 and aligned with the rib 13. The toe slot 121 extends forward to a location adjacent to a front edge of the vamp 12. The toe slot 121.is provided for ejection of a mold device 2. In an example, the flip-flop shoe 1 can be formed from elastic, plastic material. The sole 11 includes anti-slipping protrusions 111. The vamp 12 includes a plurality of through-holes 122 and vents 123.

With reference to FIGS. 1-8, a method for integrally forming a flip-flop shoe 1 according to the present invention includes a rib 13 adapted to extend between two toes of the foot of the wearer. The method includes a step (A) of preparing a mold device 2 including an upper mold 21, a middle mold 22, and a lower mold 23 corresponding to a shape of the flip-flop shoe 1. The middle mold 22 includes a slot 221 extending forwards and corresponding to the rib 13 and the toe slot 121. The upper mold 21 includes an insertion block 211 extending downwards and corresponding to the toe slot 121.

In a step (B), the mold device 2 is actuated to close the upper and lower molds 21 and 23, with the middle mold 22 located between the upper and lower molds 21 and 23. A sole cavity 25 for forming the sole 11 is defined between the middle mold 22 and the lower mold 23. A vamp cavity 24 for forming the vamp 12 is defined between the upper mold 21 and the middle mold 22. The insertion block 211 of the upper mold 21 is received in the slot 221 of the middle mold 22. The insertion block 211 of the upper mold 21 extends forward to a location adjacent to a front edge of the vamp cavity 24. Thus, a rib cavity 26 for forming the rib 13 is defined between an end of the slot 221 of the middle mold 22 and the insertion block 211. The rib cavity 26 has two ends intercommunicated with the sole cavity 25 and the vamp cavity 24, respectively. In an example, each of the upper mold 21 and the middle mold 22 includes a plurality of protrusions 212, 222 in the vamp cavity 24. The protrusions 212 of the upper mold 21 abut the protrusions 222 of the middle mold 22 for forming the through-holes 122 in the vamp 12 of the flip-flop shoe 1. Furthermore, each of the upper mold 21 and the middle mold 22 includes a plurality of protrusive faces 213, 223 in the vamp cavity 24. The protrusive faces 213 of the upper, mold 21 abut the protrusive faces 223 of the middle mold 22 for forming the vents 123. Furthermore, the lower mold 23 includes a plurality of recessed portions 231 in the sole cavity 25.

Figure 9:
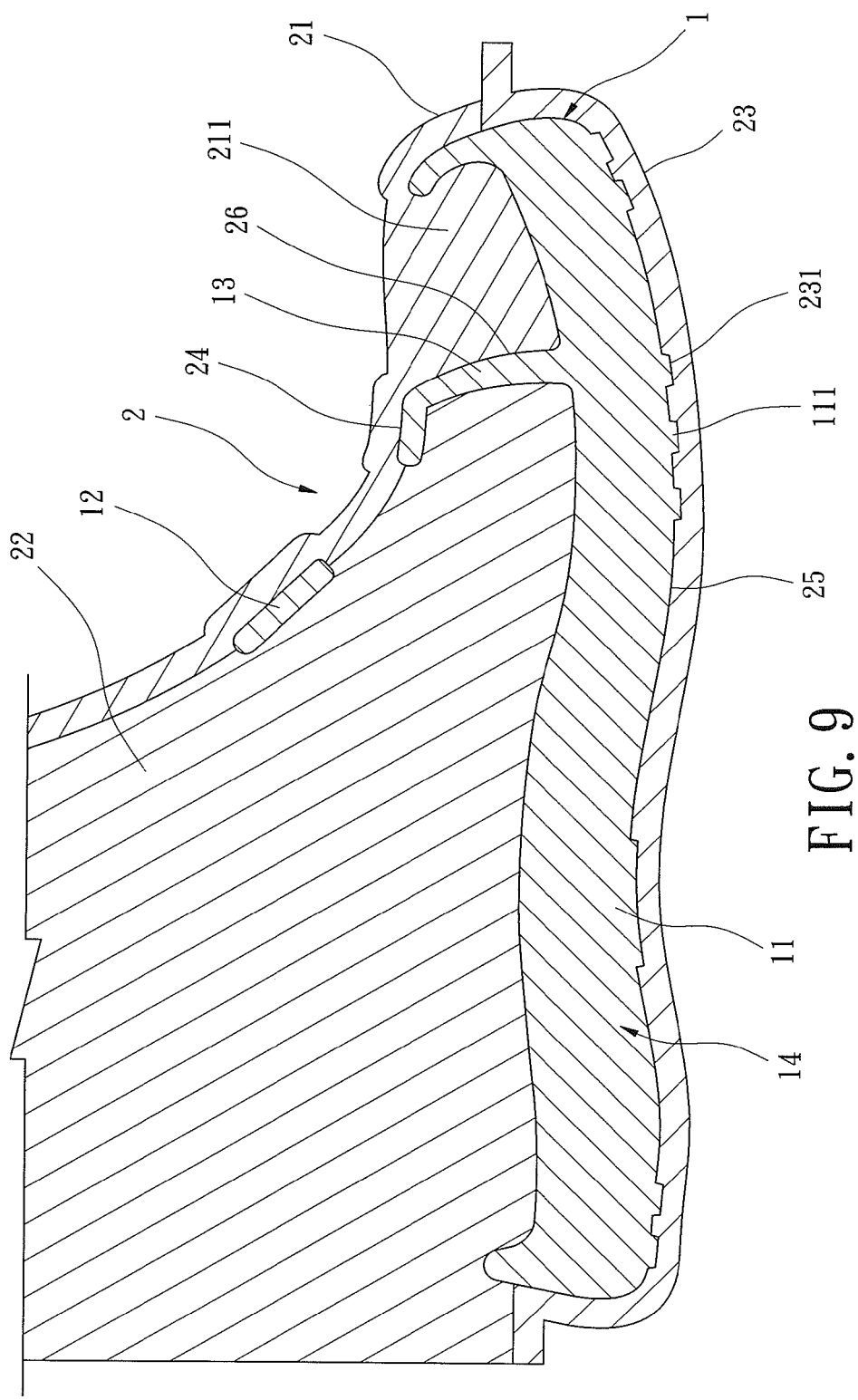
FIG. 9 is a view similar to FIG. 4, illustrating production of a flip-flop by injection molding.

In a step (C), molten plastic material 14 (FIG. 9) is filled into the sole cavity 25, the vamp cavity 24, and the rib cavity 26 of the mold device 2 to form an integral flip-flop shoe including the sole 11, the vamp 12, the rib 13, and the toe slot 121 (see FIGS. 1, 2, and 9).

In a step (D), the mold device (2) is actuated to open the upper and lower molds 21 and 23, and the integral flip-flop shoe 1 is removed from the middle mold 22. The upper, middle, and lower molds 21, 22, and 23 according to the present invention can be used to proceed with automatic mass production of integrally formed flip-flop shoes 1 through molding. Furthermore, the flip-flop shoe 1 with the integrally formed rib 13 is suitable to the wearer for wearing and walking while protecting the instep 41 and the toes 42, providing wearing comfort, hygiene, and safety.

Figure 4:
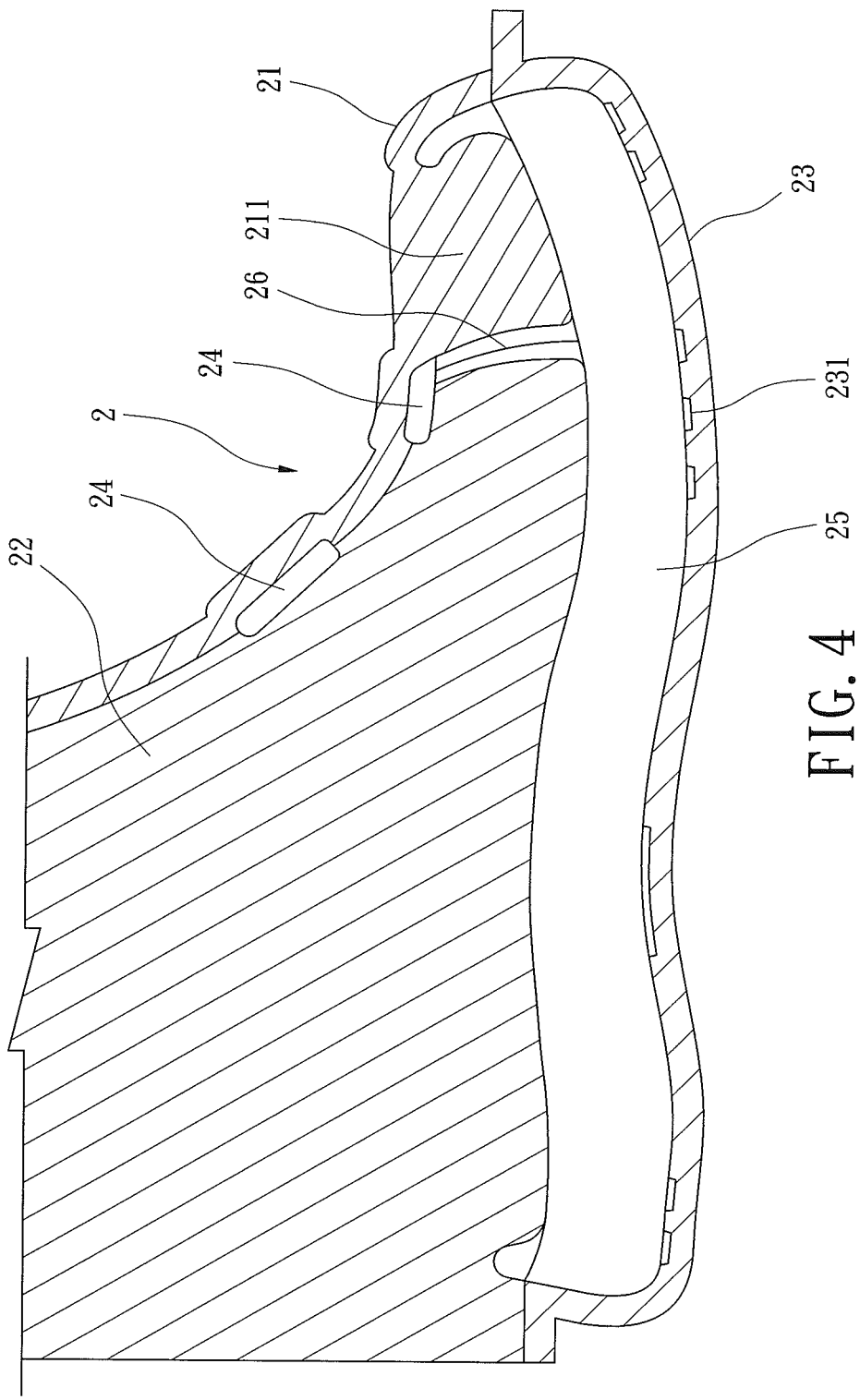
FIG. 4 is a cross sectional view of a mold device for producing a flip-flop shoe according to the present invention, with the mold device in a closed state.
Figure 5:
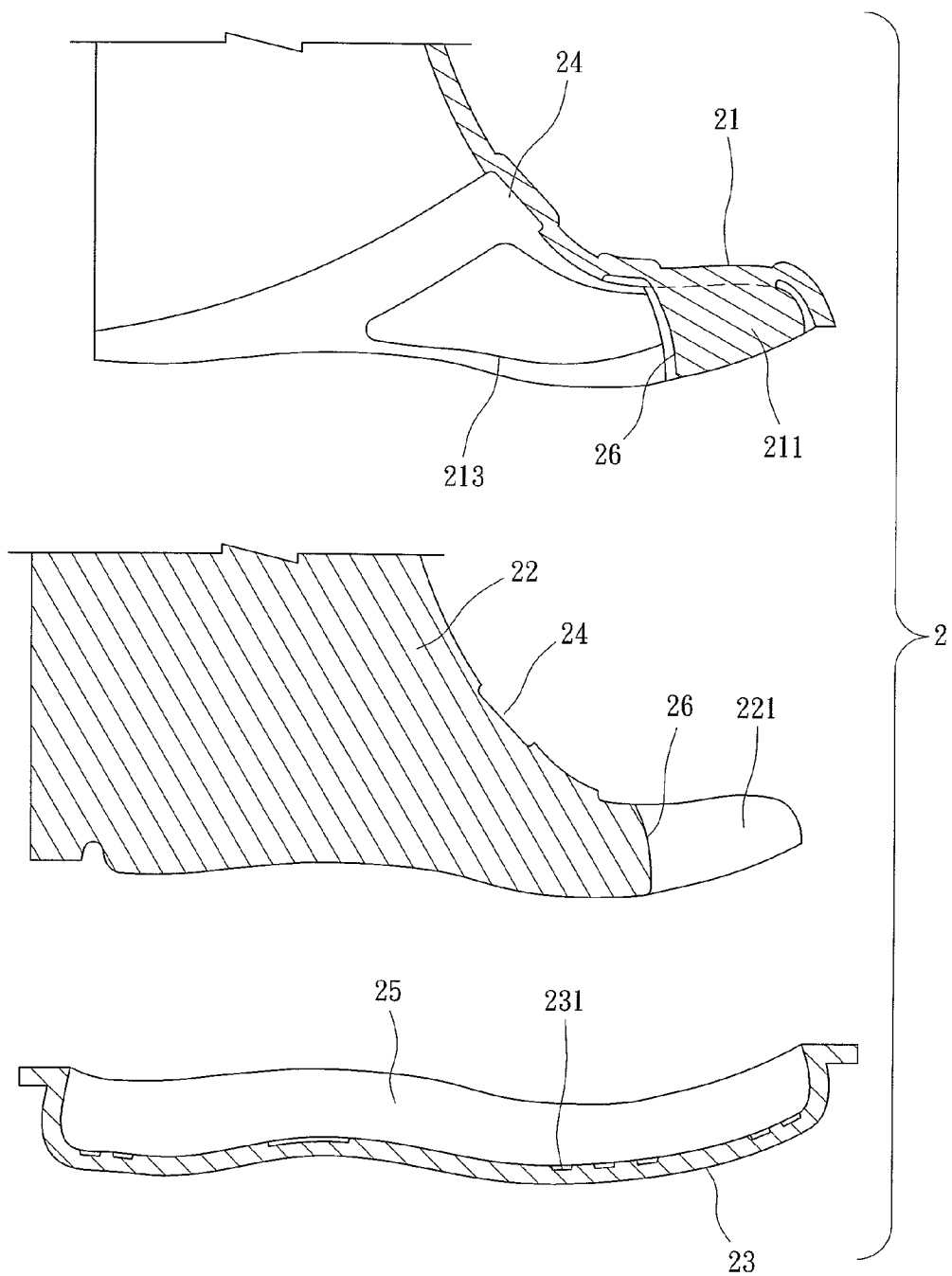
FIG. 5 is a cross sectional view illustrating opening of the mold device of FIG. 4.
Figure 6:
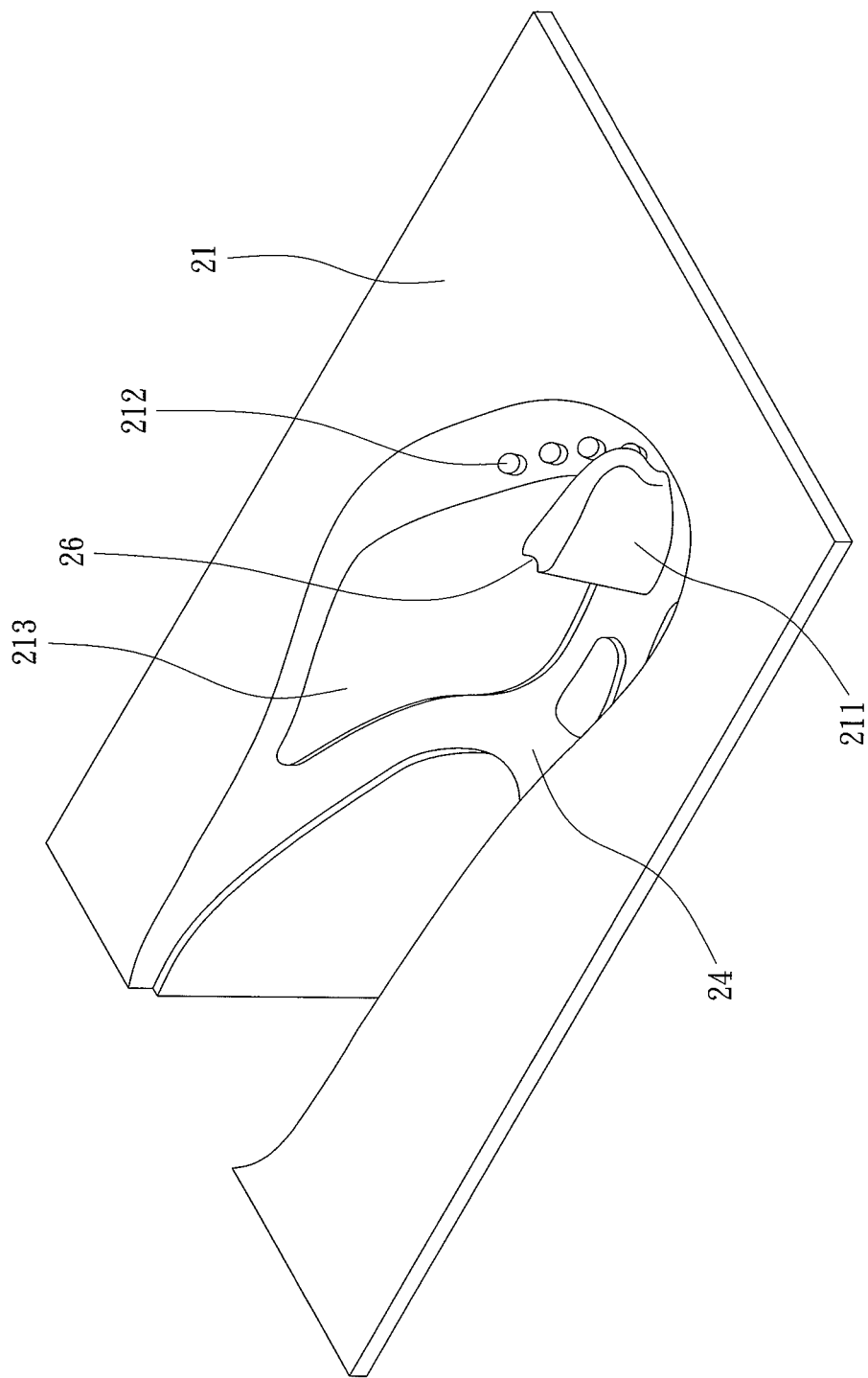
FIG. 6 is a bottom, perspective view of an upper mold of the mold device of FIG. 5.
Figure 7:
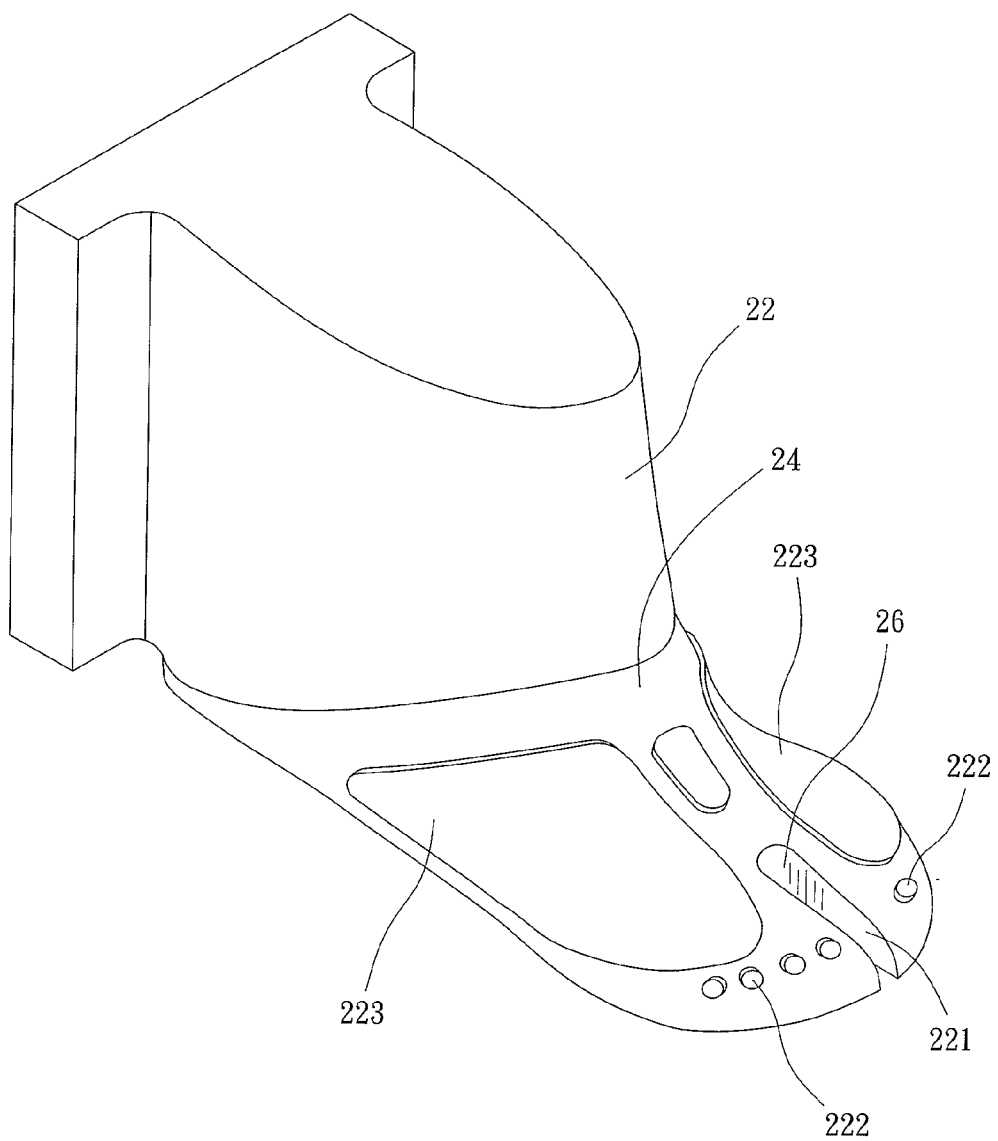
FIG. 7 is a perspective view of a middle mold of the mold device of FIG. 5.
Figure 8:
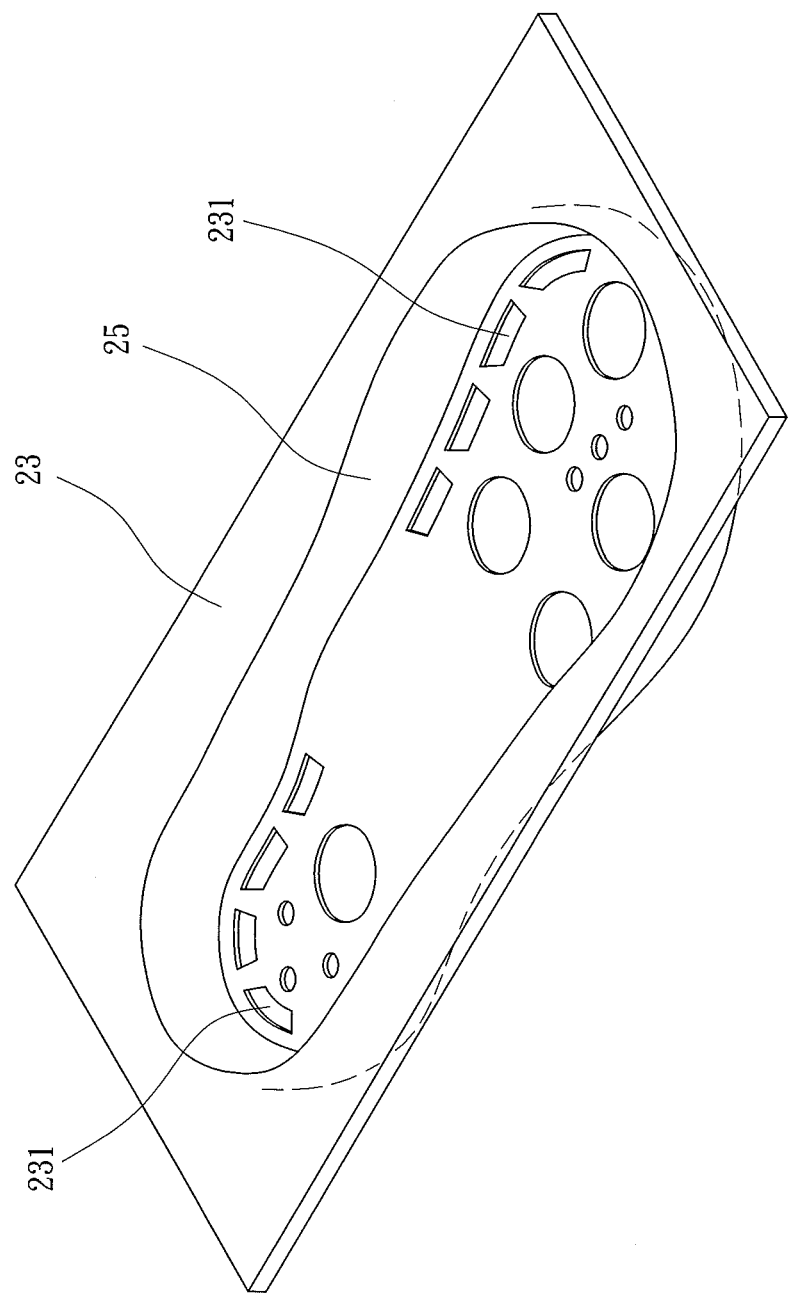
FIG. 8 is a perspective view of a lower mold of the mold device of FIG. 5.
Figure 10:
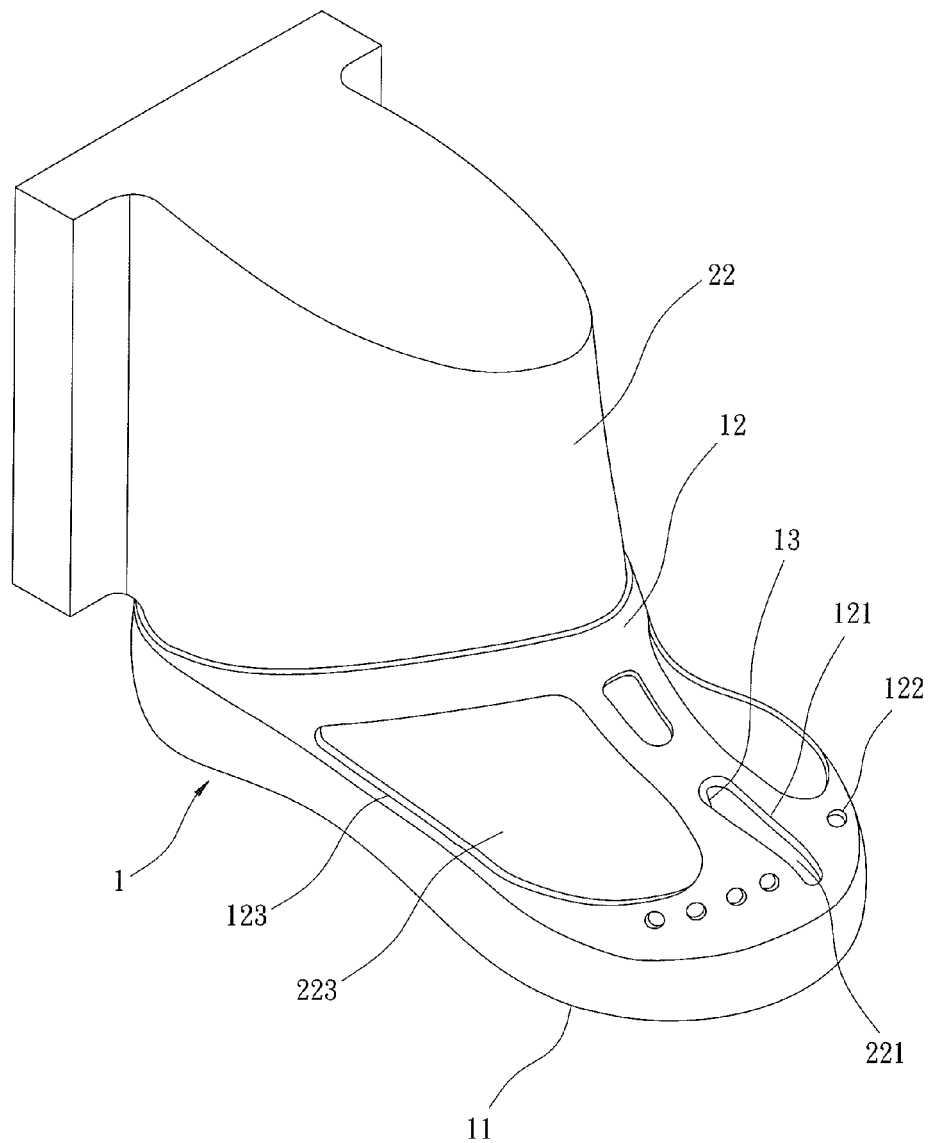
FIG. 10 is a perspective view illustrating the middle mold and the flip-flop shoe after opening the mold device.
Figure 11:
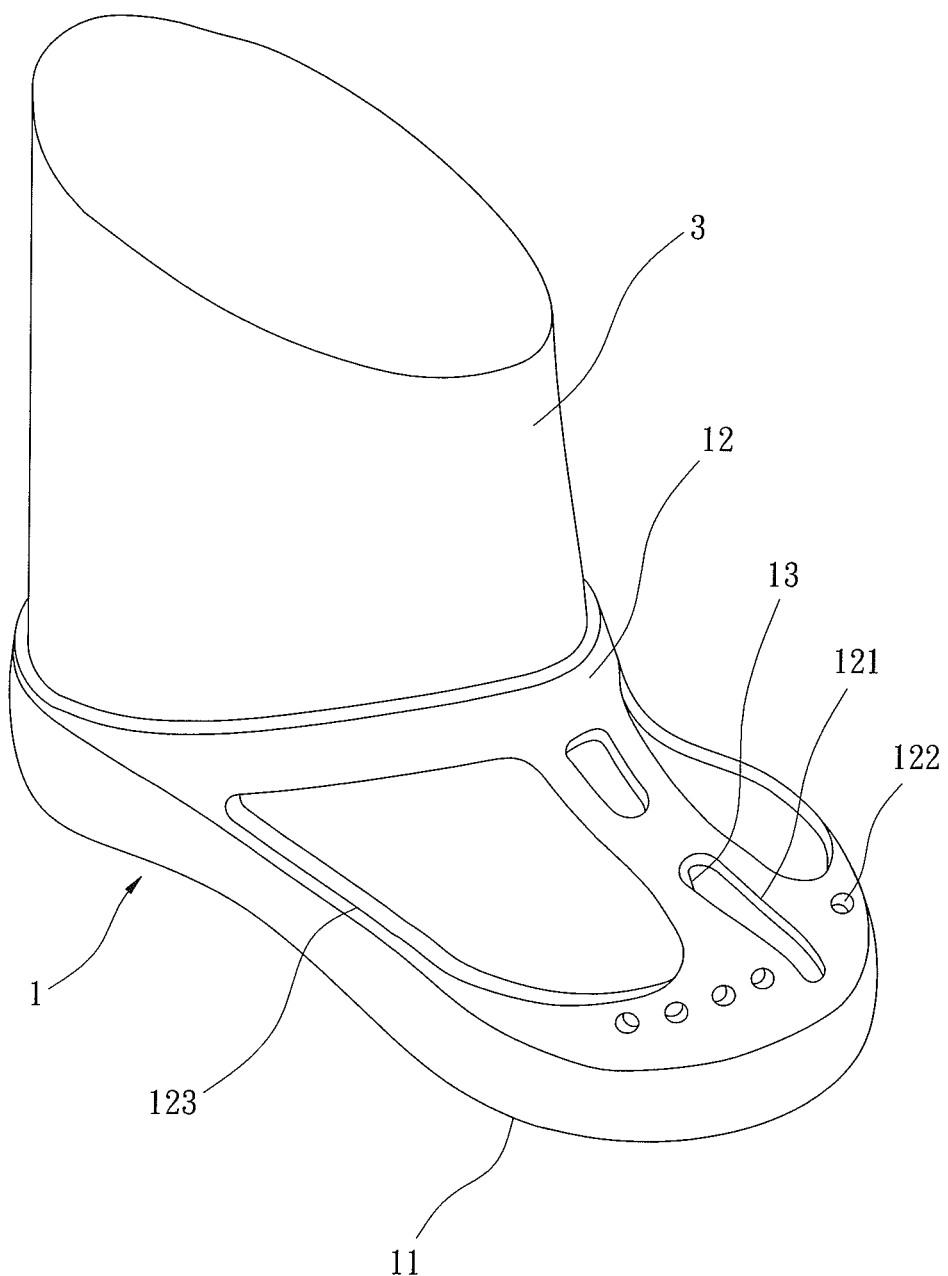
FIG. 11 is a perspective view illustrating cooling and shaping of the flip-flop shoe of FIG. 10 by mounting the flip-flop shoe on a shoe last.

With reference to FIGS. 4, 9, and 10, the mold device 2 according to the present invention can be used to proceed with injection of foaming type plastic material 14 to produce the flip-flop shoe 1. Firstly, the shapes of the sole cavity 25, the vamp cavity 24, and the rib cavity 26 of the mold device 2 are set to be smaller than the shapes of the sole 11, the vamp 12, and the rib 13 of the flip-flop shoe 1. Then, in step (C), molten plastic foam material 14 is filled into the mold device 1 to form a foaming flip-flop shoe 1. Next, in step (D), the flip-flop shoe 1 in a foaming, expanding state is removed from the middle mold 22. The method further includes a step (E) of placing the flip-flop shoe 1 in the foaming, expanding state on a shoe last 3 and proceeding with cooling and shaping, and then removing an integrally foamed flip-flop shoe 1 from the shoe last 3.

Although specific embodiments have been illustrated and described, numerous modifications and variations are still possible without departing from the scope of the invention. The scope of the invention is limited by the accompanying claims.

The invention claimed is:

1. A method for integrally forming a flip-flop shoe including a sole, a vamp integrally connected to an edge of the sole, and a rib interconnected between the sole and the vamp, with the sole, the vamp, and the rib integrally formed of a same material as an inseparable member, with the vamp adapted to extend around an instep and toes of a foot of a wearer, with the rib adapted to extend between two of the toes of the foot of the wearer, with the vamp including upper and lower sides and a toe slot extending from the upper side through the lower side of the vamp and aligned with the rib, and with the toe slot extending forwards to a location adjacent to a front edge of the vamp, with the method comprising:

(A) preparing a mold device including an upper mold, a middle mold, and a lower mold corresponding to a shape of the flip-flop shoe, with the middle mold including a slot extending forwards and corresponding to the rib and the toe slot, and with the upper mold including an insertion block extending downwards and corresponding to the toe slot;

(B) actuating the mold device to close the upper and lower molds, with the middle mold located between the upper and lower molds, with a sole cavity for forming the sole defined between the middle mold and the lower mold, with a vamp cavity for forming the vamp defined between the upper mold and the middle mold, with the insertion block of the upper mold received in the slot of the middle mold, with a rib cavity for forming the rib defined between an end of the slot of the middle mold and the insertion block, and with the rib cavity having two ends intercommunicated with the sole cavity and the vamp cavity, respectively;

(C) filling molten plastic material into the sole cavity, the vamp cavity, and the rib cavity of the mold device to form an integral flip-flop shoe including the sole, the vamp, the rib, and the toe slot; and (D) actuating the mold device to open the upper and lower molds, and removing the integral flip-flop shoe from the middle mold.

2. The method for integrally forming a flip-flop shoe as claimed in claim 1, with each of the upper mold and the middle mold including a plurality of protrusions in the vamp cavity, with the plurality of protrusions of the upper mold abutting the plurality of protrusions of the middle mold, forming a plurality of through-holes in the vamp of the flip-flop shoe.

3. The method for integrally forming a flip-flop shoe as claimed in claim 1, wherein the insertion block of the upper mold extends to a location adjacent to a front edge of the vamp cavity.

4. The method for integrally forming a flip-flop shoe as claimed in claim 1, with the sole cavity, the vamp cavity, and the rib cavity of the mold device having shapes smaller than shapes of the sole, the vamp, and the rib of the flip-flop shoe, with step (C) including filling molten plastic foam material into the mold device to form a foaming flip-flop shoe, and with step (D) including removing the flip-flop shoe in a foaming, expanding state from the middle mold.

5. The method for integrally forming a flip-flop shoe as claimed in claim 4, further comprising a step (E) of placing the flip-flop shoe in the foaming, expanding state on a shoe last and proceeding with cooling and shaping, and then removing an integrally foamed flip-flop shoe from the shoe last.

\* \* \* \* \*